US011086067B2

(12) United States Patent
Fang et al.

(10) Patent No.: US 11,086,067 B2
(45) Date of Patent: Aug. 10, 2021

(54) DISPLAY BACKLIGHT MODULE HAVING LIGHT GUIDE PLATE WITH THROUGH HOLE AND EMBEDDED OPTIC FIBERS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Liyu Fang, Beijing (CN); Lingyu Sun, Beijing (CN); Xiuyun Chen, Beijing (CN); Jingjun Du, Beijing (CN); Fei Liang, Beijing (CN); Tingxiu Hou, Beijing (CN); Peng Zhong, Beijing (CN)

(73) Assignees: BEIJING BOE OPTOELECTRONICS TECHNOLOGY CO., LTD, Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/643,211

(22) PCT Filed: Sep. 17, 2019

(86) PCT No.: PCT/CN2019/106202
§ 371 (c)(1),
(2) Date: Feb. 28, 2020

(87) PCT Pub. No.: WO2020/103547
PCT Pub. Date: May 28, 2020

(65) Prior Publication Data
US 2021/0003769 A1    Jan. 7, 2021

(30) Foreign Application Priority Data

Nov. 19, 2018 (CN) .......................... 201811375376.5

(51) Int. Cl.
G02B 6/08 (2006.01)
F21V 8/00 (2006.01)
G02B 6/02 (2006.01)

(52) U.S. Cl.
CPC ........... *G02B 6/0055* (2013.01); *G02B 6/003* (2013.01); *G02B 6/0065* (2013.01); *G02B 6/02333* (2013.01)

(58) Field of Classification Search
CPC ...... G02B 6/0055; G02B 6/003; G02B 6/005; G02B 6/002; G02B 6/0023; G02B 6/0011;
(Continued)

(56) References Cited

U.S. PATENT DOCUMENTS 3,043,910 A * 7/1962 Hicks, Jr. ................ G02B 6/08
                                                              348/804
3,864,034 A * 2/1975 Yevick ................... G03B 21/32
                                                              353/120
(Continued)

FOREIGN PATENT DOCUMENTS

CN    201081152 Y    7/2008
CN    102092340 A    6/2011
(Continued)

OTHER PUBLICATIONS

First Office Action issued in corresponding Chinese Application No. 201811375376.5, dated Oct. 21, 2019, with English language translation.

*Primary Examiner* — Ismael Negron
(74) *Attorney, Agent, or Firm* — McDermott Will & Emery LLP

(57) ABSTRACT

A light guide plate includes a through hole; at least one light transmitting component disposed within the light guide plate; at least one light incident surface; at least one light source; and at least one lens structure located between the
(Continued)

light source and the incident surface. The light transmitting component is configured to transmit a portion of light that enters the light incident surface to a first region of the light guide plate that would otherwise be masked by the through hole. The light guide plate might backlight a display panel. A method for manufacturing the light guide plate is also provided.

19 Claims, 12 Drawing Sheets

(58) Field of Classification Search
CPC ............... G02B 6/0033; G02B 6/0035; F21V 2200/10; F21V 2200/13
See application file for complete search history.

(56) References Cited

U.S. PATENT DOCUMENTS

| | | | | |
|---|---|---|---|---|
| 5,251,280 A | * | 10/1993 | Asada | G09F 9/35 385/115 |
| 6,022,117 A | * | 2/2000 | Tenmyo | G02B 6/002 362/16 |
| 7,031,579 B2 | * | 4/2006 | Sisodia | G02B 6/06 348/E5.143 |
| 7,503,666 B2 | * | 3/2009 | Tamura | G02B 6/002 362/23.01 |
| 7,995,882 B2 | * | 8/2011 | Wanninger | G02B 6/0046 385/31 |
| 8,434,909 B2 | * | 5/2013 | Nichol | G02B 6/0076 362/296.01 |
| 8,675,151 B2 | | 3/2014 | Choi et al. | |
| 9,612,381 B2 | * | 4/2017 | Kurata | G02B 6/0016 |
| 10,047,924 B2 | * | 8/2018 | Faffelberger | F21S 43/239 |
| 10,092,184 B2 | * | 10/2018 | Griggio | A61B 3/0008 |
| 10,677,979 B2 | * | 6/2020 | Kuge | G02B 6/002 |
| 10,838,202 B2 | * | 11/2020 | Asai | G02B 6/0033 |
| 2015/0226907 A1 | | 8/2015 | Hu et al. | |
| 2017/0059771 A1 | | 3/2017 | Yuki et al. | |
| 2017/0153486 A1 | | 6/2017 | Ahn et al. | |
| 2018/0039008 A1 | | 2/2018 | Shi | |

FOREIGN PATENT DOCUMENTS

| | | | | |
|---|---|---|---|---|
| CN | 204328709 U | | 5/2015 | |
| CN | 104832884 A | | 8/2015 | |
| CN | 105223642 | * | 1/2016 | ........... G02B 6/0011 |
| CN | 105223642 A | | 1/2016 | |
| CN | 106019718 A | | 10/2016 | |
| CN | 106461173 A | | 2/2017 | |
| CN | 206176077 U | | 5/2017 | |
| CN | 107193155 A | | 9/2017 | |
| CN | 208110291 U | | 11/2018 | |
| CN | 109254345 A | | 1/2019 | |
| JP | 2004-14122 A | | 1/2004 | |
| TW | I572945 B | | 3/2017 | |
| TW | 201728976 A | | 8/2017 | |

* cited by examiner

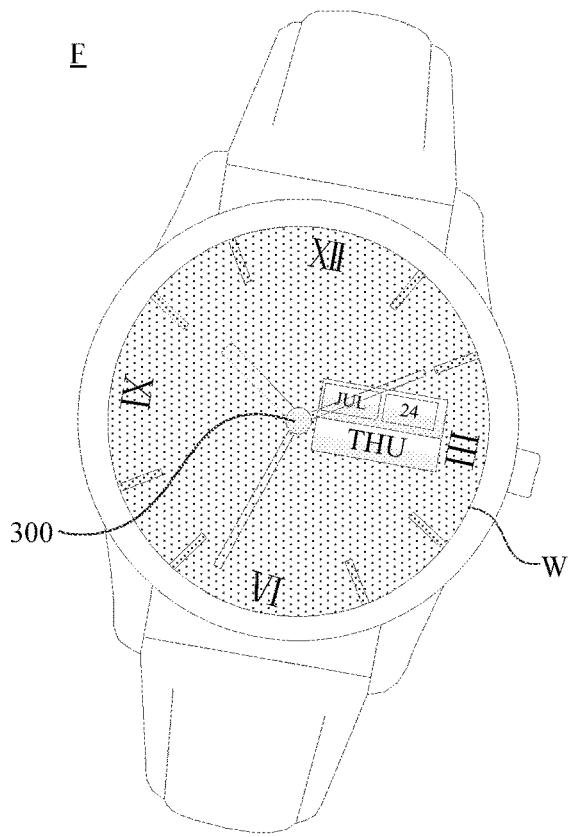

FIG. 8

| Form a first body layer. A main surface of the first body layer has at least one first groove, and the first body layer includes at least one first through hole. | S100 |

↓

| Place at least one optical fiber in each first groove. | S200 |

↓

| Form a second body layer on a side of the first body layer on which the at least one optical fiber has been placed. The second body layer has at least one second through hole in one-to-one correspondence with the at least one first through hole of the first body layer, and at least one second through hole is communicated with the at least one first through hole in one-to-one correspondence to form at least one first via hole; and a main surface of the second body layer facing the first body layer has at least one second groove, and the at least one second groove is matched with the at least one first groove in one-to-one correspondence to form at least one channel. | S300 |

FIG. 9

DISPLAY BACKLIGHT MODULE HAVING LIGHT GUIDE PLATE WITH THROUGH HOLE AND EMBEDDED OPTIC FIBERS

CROSS-REFERENCE TO RELATED APPLICATIONS

This application is a national phase entry under 35 USC 371 of International Patent Application No, PCT/CN2019/106202 filed on Sep. 17, 2019, which claims priority to Chinese Patent Application No. 201811375376.5, filed with the Chinese Patent Office on Nov. 19, 2018, titled "LIGHT GUIDE PLATE AND MANUFACTURING METHOD THEREFOR, BACKLIGHT MODULE, DISPLAY MODULE AND TERMINAL", which are incorporated herein by reference in their entirety.

TECHNICAL FIELD

The present disclosure relates to the field of display technologies, and in particular, to a light guide plate and a manufacturing method therefor, a backlight module, a display device and a terminal.

BACKGROUND

A smart wearable product is a wearable smart device that is developed by applying wearable technologies to intelligent designs of daily worn objects. As for a smart wearable product that needs to display time (such as a smart watch), in order to reduce power consumption of the smart wearable product and increase a usage time of the smart wearable product, via holes are formed in a display panel and a backlight module, and mechanical pointers are disposed in the via holes to display time, thereby reducing power consumption of the display panel required for displaying time, and achieving reduction of power consumption of the display panel.

SUMMARY

In one aspect, a light guide plate is provided. The light guide plate includes at least one light transmitting component and a light guide plate body having at least one light incident surface. The at least one light transmitting component is disposed in the light guide plate body. A light transmitting component of the at least one light transmitting component is configured to transmit a portion of light that enters the light guide plate body from a light incident surface of the light guide plate body to a first region of the light guide plate body.

In some embodiments, the light transmitting component includes a first end and a second end. The first end of the light transmitting component is configured to receive the portion of light that enters the light guide plate body. The second end of the light transmitting component is configured to allow the portion of light that enters the light guide plate body to exit from the light transmitting component, and the second end is substantially located in the first region or is located in the first region.

In some embodiments, the light transmitting component includes at least one optical fiber. Each optical fiber includes a first end and a second end. The first end of the optical fiber is configured to receive a portion of light that enters the light guide plate body, and the second end of the optical fiber is configured to allow light received by the first end of the optical fiber to exit from the optical fiber.

In some embodiments, the light guide plate further includes at least one light reflecting member disposed on a side face of the light guide plate body. One of the at least one light reflecting member proximate to the second end of the optical fiber is configured to reflect light emitted from the second end of the optical fiber to the first region.

In some embodiments, each light reflecting member includes a metal layer.

In some embodiments, the at least one light reflecting member includes a plurality of light reflecting members, the at least one light transmitting component includes a plurality of light transmitting components, and a number of optical fibers corresponding to each light reflecting member is equal.

In some embodiments, the light guide plate further includes at least one lens structure. A lens structure is disposed on a light incident surface of the light guide plate body, or the at least one lens structure includes at least one outward protrusion of the light guide plate body at a light incident surface of the light guide plate body. Each lens structure is configured to converge at least a portion of the light that enters the light guide plate body to a focus of the lens or a position substantially at the focus of the lens. First ends of one or more light transmitting components are disposed at a focus of each lens structure or a position substantially at the focus of the lens structure.

In some embodiments, the light guide plate body further includes at least one channel provided in the light guide plate body. Each channel is provided with at least one light transmitting component therein.

In some embodiments, the at least one light transmitting components is arranged at an edge of the light guide plate body.

In some embodiments, an optical fiber includes an inner core, and a cladding covering an outer surface of the inner core. A refractive index of the inner core and a refractive index of the cladding are both greater than a refractive index of the light guide plate body.

In some embodiments, the light guide plate includes at least one first via hole. The first region is located at a side of the at least one via hole facing away from the light incident surface.

In another aspect, a backlight module is provided. The backlight module includes the light guide plate according to the above embodiments and at least one light source disposed at the at least one light incident surface of the light guide plate body of the light guide plate. The at least one light source is configured to provide light for the light guide plate body.

In some embodiments, the light guide plate includes at least one lens structure, the at least one lens structure is located between the at least one light source and the at least one light incident surface of the light guide plate body.

In some embodiments, the light guide plate includes at least one light reflecting member and the light guide plate body has at least one first via hole, a light reflecting member is disposed on an extension line of a connection line between a light source and a first via hole, is disposed at a side of the first via hole facing away from the light source, and is disposed on a side face of the light guide plate body away from the at least one light incident surface.

In some embodiments, the light guide plate has one first via hole, the backlight module includes at least two light sources, and the light guide plate includes at least two light reflecting members. The at least two light reflecting members are respectively disposed on extension lines of connection lines between the at least two light sources and the first via hole, and is disposed on the side face of the light guide plate body away from the at least one light incident surface.

In some embodiments, the light guide plate has at least one first via hole, the backlight module further includes: a back plate, an outer plastic frame disposed outside the light guide plate and the at least one light source in a direction perpendicular to a thickness of the back plate and disposed on the back plate, and at least one inner plastic frame disposed in the at least one first via hole in one-to-one correspondence. The light guide plate and the at least one light source are disposed on the back plate. Each inner plastic frame has a second via hole.

In some embodiments, the backlight module further includes: a light-shielding adhesive disposed at a side of the inner plastic frame and the outer plastic frame facing away from the back plate, and an optical film layer disposed between the light-shielding adhesive and the light guide plate. The light-shielding adhesive has an opening and at least one third via hole. An orthographic projection of the opening on the back plate is within an orthographic projection of the light guide plate body on the back plate. The at least one third via hole is communicated with at least one second via hole in one-to-one correspondence. The optical film layer includes at least one of a diffusion plate, a lower prism sheet, or an upper prism sheet that are sequentially stacked in a direction of a thickness of the light guide plate. The optical film layer has at least one fourth via hole, and the at least one fourth via hole is communicated with at least one second via hole in one-to-one correspondence.

In yet another aspect, a display device is provided. The display device includes the backlight module according to the above embodiments and a display panel disposed on a light exit side of the backlight module. The display panel has at least one fifth via hole, and the at least one fifth via hole is communicated with at least one second via hole in one-to-one correspondence.

In yet another aspect, a terminal is provided. The terminal includes the display device according to the above embodiments. One of the at least one fifth via hole is provided with a rotating shaft therein.

In yet another aspect, a method for manufacturing a light guide plate is provided. The method for manufacturing the light guide plate includes: forming a first body layer including at least one first through hole; placing at least one light transmitting component in each first groove; and forming a second body layer including at least one second through hole on a side of the first body layer on which the at least one light transmitting component has been placed. A main surface of the first body layer has at least one first groove, a main surface of the second body layer facing the first body layer has at least one second groove, the at least one first through hole is communicated with the at least one second through hole in one-to-one correspondence, and the at least one first groove is matched with the at least one second groove in one-to-one correspondence.

BRIEF DESCRIPTION OF THE DRAWINGS

In order to describe technical solutions in the present disclosure more clearly, the accompanying drawings to be used in some embodiments of the present disclosure will be introduced briefly. Obviously, the accompanying drawings to be described below are merely some embodiments of the present disclosure, and a person of ordinary skill in the art may obtain other drawings according to those accompanying drawings without paying any creative effort.

FIG. 313 is a schematic diagram of another lens structure of a light guide plate, in accordance with some embodiments of the present disclosure;

FIG. 8 is a schematic diagram of a terminal; in accordance with some embodiments of the present disclosure;

FIG. 9 is a flow diagram of a method for manufacturing a light guide plate; in accordance with some embodiments of the present disclosure; and FIGS. 10A to 100 are schematic diagrams showing steps of a method for manufacturing a light guide plate, in accordance with some embodiments of the present disclosure.

DETAILED DESCRIPTION

The technical solutions in some embodiments of the present disclosure will be described clearly and completely with reference to the accompanying drawings. Obviously, the described embodiments are merely some but not all of embodiments of the present disclosure. All other embodiments obtained on a basis of the embodiments of the present disclosure by a person of ordinary skill in the art shall be included in the protection scope of the present disclosure.

Backlight refers to light that enters from a back side of a display panel (i.e., a side opposite to a display side of the display panel). The backlight is used to increase brightness of the display panel in an electronic device, so that the display panel may clearly display images. A backlight module refers to a module that provides backlight for the display panel in the electronic device. A function of the backlight module is to provide uniform light with high luminance to the display panel. The backlight module mainly includes two types, i.e., a side-type backlight module and a direct-type backlight module. As for the side-type backlight module, a basic principle thereof is that light emitted by point light sources or linear light sources is transformed into light emitted from an entire surface with high luminance and uniform luminance by using a light guide plate, so that the display panel may display an image normally.

In some exemplary embodiments, the light guide plate of the side-type backlight module is generally composed of an optical-grade acrylic plate. A bottom surface of the light guide plate facing away from the display panel is provided with light guide points, and the point light sources or the linear light sources are disposed at one side face of the light guide plate (or the point light sources or the linear light sources are disposed at two opposite side faces of the light guide plate). The light guide plate receives light at side faces of the light guide plate. When light guide points in the light guide plate is irradiated by light emitted by the light sources, light reflected by the light guide points is diffused in all directions. Finally, the light is emitted from a side of the light guide plate facing the display panel, thereby making it possible that the light is uniformly emitted from the side of the light guide plate proximate to the display panel.

Figure 1A:
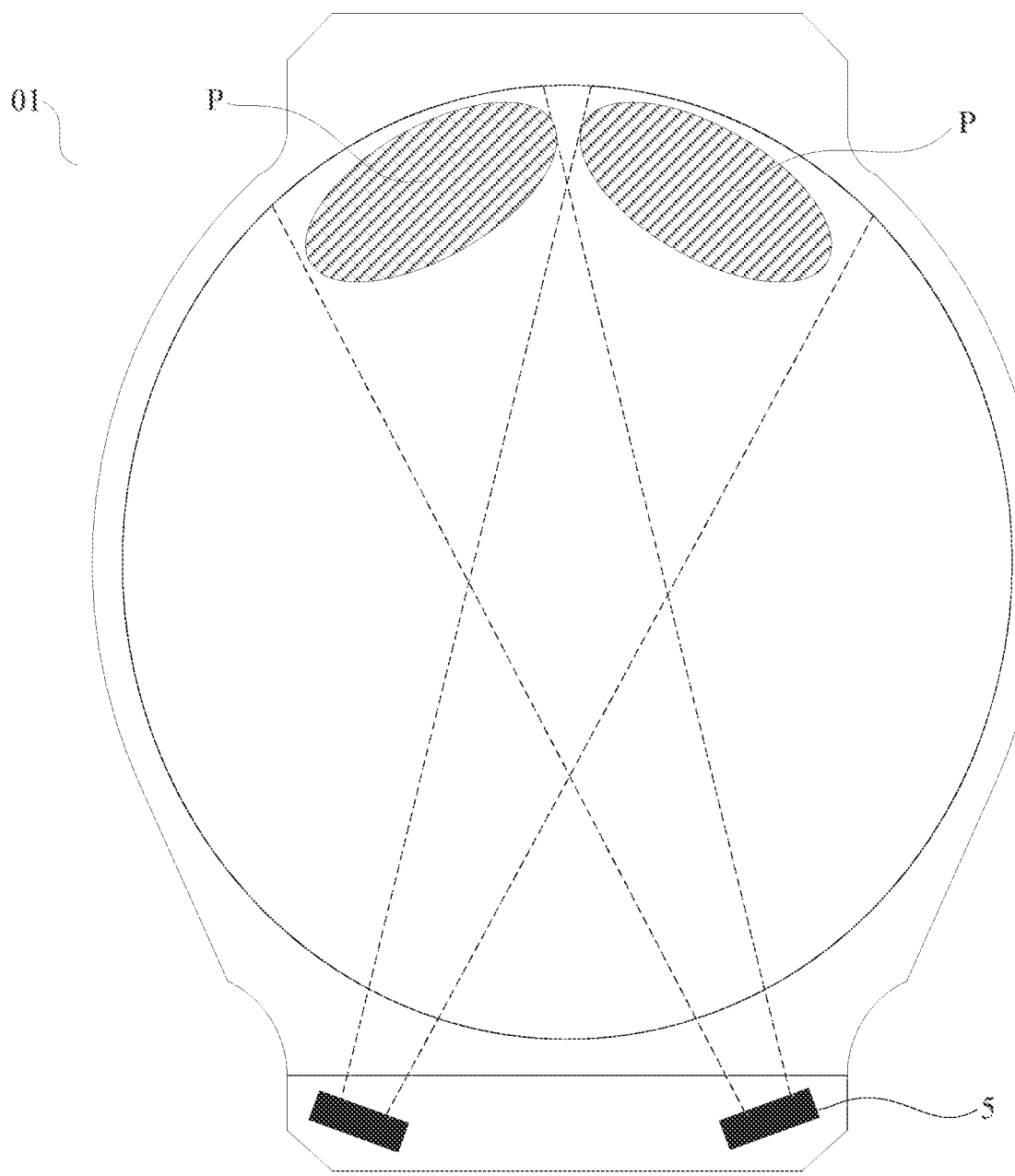
FIG. 1A is a schematic diagram of an application scenario in the related art.

As for a smart wearable product, in order to reduce power consumption, the light sources are usually disposed at only one side face of the light guide plate. However, as shown in FIG. 1A, when light emitted by light sources 5 propagates in a light guide plate 01, with an increase of a light transmission distance, an amount of light traveling to a corresponding region will decrease accordingly, Therefore, an amount of light in a region of the light guide plate 01 away from the light sources 5 is less than an amount of light in a region of the light guide plate 01 proximate to the light sources 5. Further, dark regions P are formed in the region of the light guide plate 01 away from the light sources 5, which causes that luminance of backlight propagating through the light guide plate is uneven, and a display quality of the display panel is reduced.

As for some smart wearable products that need to display time, such as a smart watch, in some possible designs, in order to reduce power consumption of a smart wearable product, one or more via holes are formed in a display panel and a backlight module of the smart wearable product. Moreover, a rotating shaft with mechanical pointers is disposed in at least one via hole, and in a manner in which time is displayed by the mechanical pointers instead of a manner in which time is displayed by the display panel, power consumption of the display panel required for displaying time is reduced, and the power consumption of the smart wearable product is reduced.

Figure 1B:
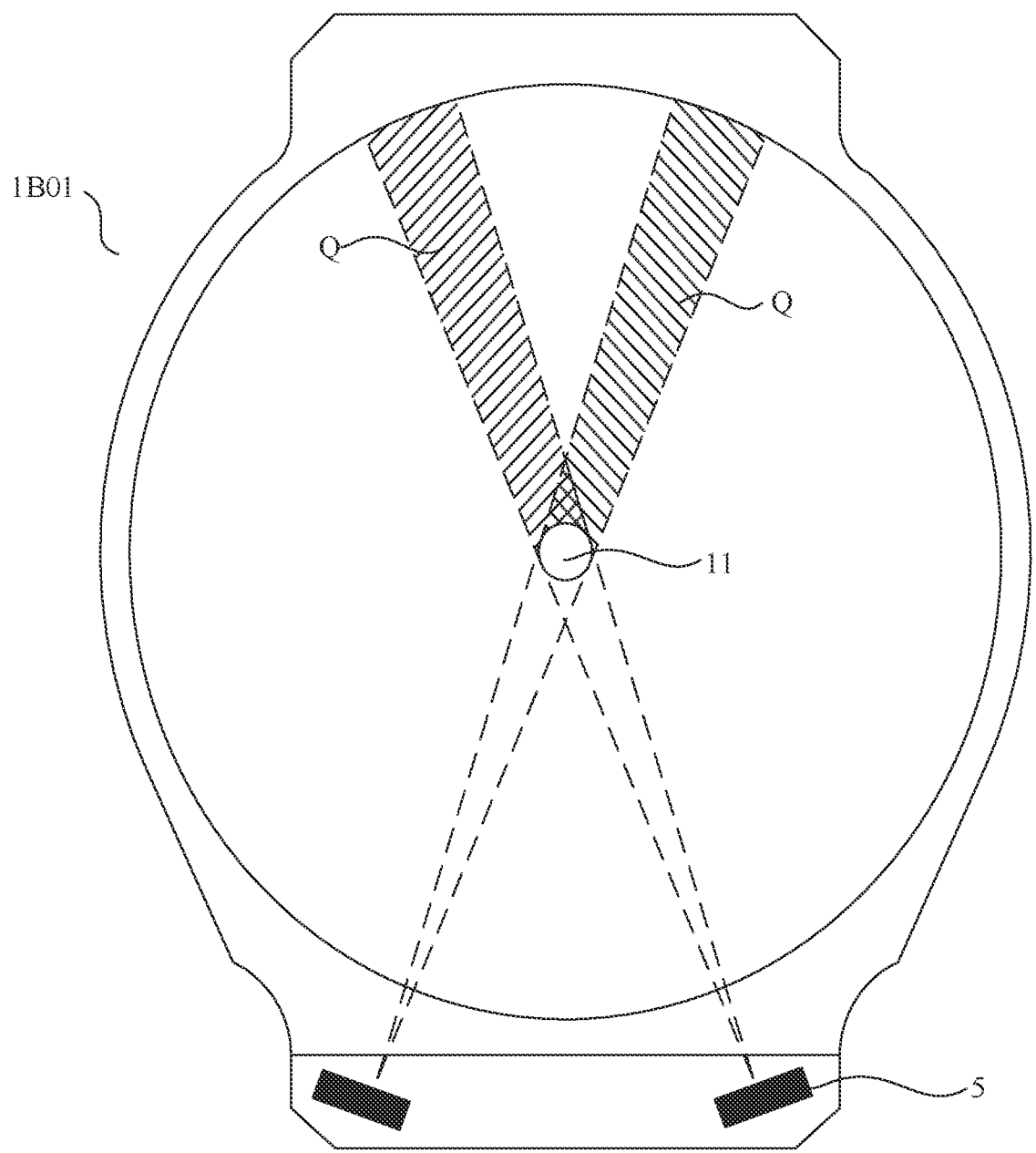
FIG. 1B is a schematic diagram of another application scenario in the related art.

As shown in FIG. 1B, since there are one or more via holes (i.e., the first via hole 11 to be mentioned below shown in FIG. 1B) in a light guide plate 1B01 of the backlight module, at least one via hole and rotating shaft(s) disposed in corresponding via hole(s) will block transmission of the light in the light guide plate. The light emitted by the light sources 5 cannot bypass the at least one via hole and the rotating shaft(s) provided therein and travel to an entire light guide plate 1B01. Therefore, obvious blocking regions Q are formed at a side of a corresponding via hole in the light guide plate 1B01 that is away from the light sources 5. Luminance of the blocking regions Q is relatively low, which seriously affects a display effect of the display panel. For example, with continued reference to FIG. 1B, the light guide plate 1B01 includes one via hole (i.e., one first via hole 11 shown in FIG. 1B) therein, and two light sources 5 are provided at a side face of the light guide plate 1B01. The via hole and the rotating shaft provided therein block light emitted by the two light sources 5, and two blocking regions Q with a low luminance are formed.

Figure 2A:
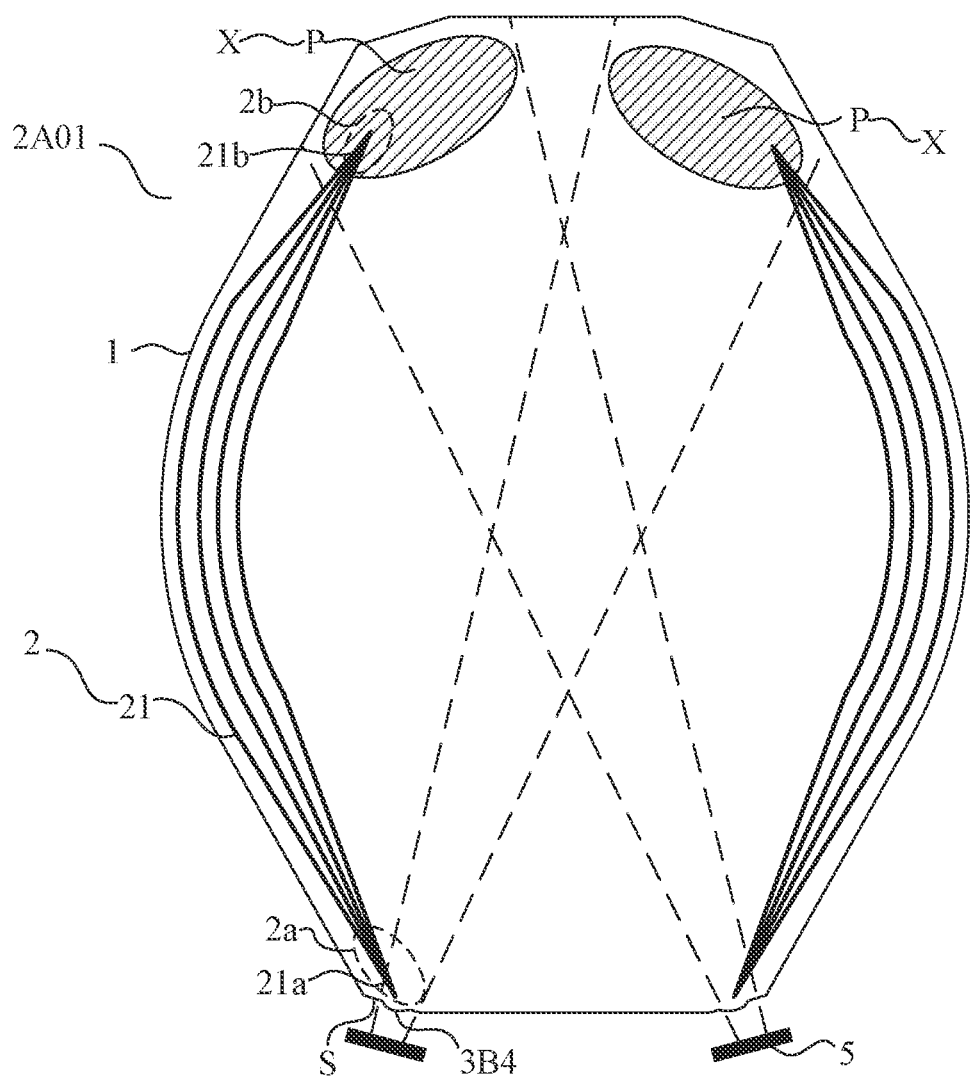
FIG. 2A is a schematic diagram showing a light guide plate and light sources, in accordance with some embodiments of the present disclosure.

Therefore, as shown in FIG. 2A, some embodiments of the present disclosure provide a light guide plate 2A01. The light guide plate 2A01 includes a light guide plate body 1 and light transmitting components 2 disposed in the light guide plate body 1. The light guide plate body 1 has light incident surfaces S. The light transmitting component 2 includes a first end 2a proximate to a light incident surface S of the light guide plate body 1. The light transmitting component 2 is configured to transmit a portion of light that enters the light guide plate body 1 from the light incident surface S of the light guide plate body 1 to a first region X of the light guide plate body 1.

The number of the light incident surface(s) S is not limited in embodiments of the present disclosure, and depends on the number of the light source(s) disposed in the backlight module. In practice, a light source is disposed at a side face of the light guide plate body, and the side face of the light guide plate body that faces the light source is the light incident surface. For example, as shown in FIG. 2O, a light guide plate body 2C1 has one light incident surface S. Or, as shown in FIGS. 2A, 2B, 2O and 2E, the light guide plate body may also have two light incident surfaces S.

In some embodiments, in a case where the dark regions P shown in FIG. 1A are formed in the light guide plate, the first regions X are the dark regions P distal to the light sources 5 in the light guide plate.

In this way, a portion of the light that enters from the light incident surfaces S of the light guide plate body propagates through the light transmitting components to the first regions X (i.e., the dark regions P) by, and an amount of light entering the first regions X is increased. Therefore, luminance of the dark regions P is improved, and a uniformity of luminance of backlight propagating through the light guide plate is also improved, which is conducive to improving a display quality of a display device.

Figure 2B:
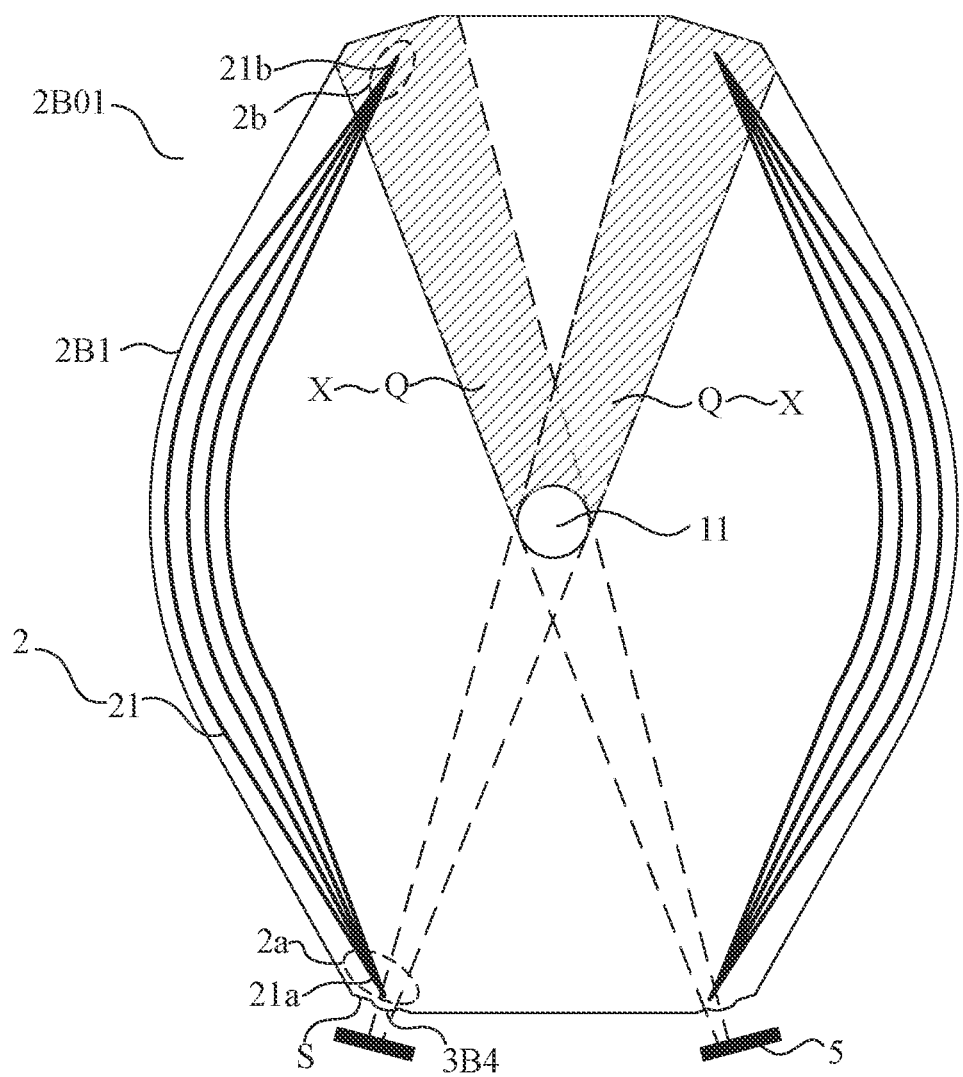
FIG. 2B is a schematic diagram showing another light guide plate and light sources, in accordance with some embodiments of the present disclosure.

In some embodiments, as shown in FIG. 2B, a light guide plate 2B01 includes at least one first via hole 11. The first regions X are located at a side of the at least one first via hole 11 facing away from the light incident surfaces S. When the light enters from the light incident surfaces S of a light guide plate body 2B1, each first via hole 11 and a rotating shaft disposed in the first via hole 11 block the transmission of light in the light guide plate body 2B1, so that the blocking regions Q shown in FIG. 1B are formed in the light guide plate body 2B1 Herein, the first ends 2a of the light transmitting components 2 are proximate to the light incident surfaces S of the light guide plate body 2B1. The light transmitting components 2 are configured to transmit a portion of the light that enters the light guide plate body 2B1 from the light incident surfaces S of the light guide plate body 2B1 to the first regions X (i.e., the blocking regions Q) of the light guide plate body 2B1.

In this way, a portion of the light that enters from the light incident surfaces S of the light guide plate body 2B1 propagates through the light transmitting components 2 to the blocking regions Q, and an amount of light traveling to the blocking regions Q is increased. Therefore, luminance of the blocking regions Q is improved, and the uniformity of the luminance of the backlight propagating through the light guide plate 2B01 is also improved, which is conducive to improving the display quality of the display device.

In some embodiments, the light transmitting component further includes a second end 2b. The second end 2b of the light transmitting component is proximate to the first region X of the light guide plate body or is located in the first region X of the light guide plate body. In this way, when light entering the light transmitting component is emitted from the second end 2b of the light transmitting component, the light enters the first region X (i.e., the dark region P) proximate to the second end 2b of the light transmitting component, or, the light enters the first region X (i.e., the dark region P) where the second end 2b of the light transmitting component is located, so that the amount of the light entering the first region X is increased. Therefore, luminance of the first region X is improved, and the uniformity of the luminance of the backlight propagating through the light guide plate is also improved, which is conducive to improving the display quality of the display device.

In some other embodiments, as shown in FIG. 2B, in a case where the light guide plate 2B01 has at least one first via hole 11 and the first regions X are the blocking regions Q shown in FIG. 1B, the second ends 2b of the light transmitting components 2 may be disposed in the blocking regions Q, so that light propagating through the light transmitting components 2 may travels to the blocking regions Q, and the amount of the light traveling to the blocking regions Q is increased, thereby improving the luminance of the blocking regions Q.

The embodiments of the present disclosure do not limit a direction and a distribution of the light transmitting components. The light transmitting components may be arranged in the light guide plate body along any distribution path, as long as the light transmitting components may transmit the light to the first regions X (i.e., the dark regions P or the blocking regions Q).

In some embodiments, as shown in FIGS. 2A to 2E, the light transmitting component include at least one optical fiber. Each optical fiber has a first end 21a. The first end 21a of the optical fiber proximate to a light incident surface S of the light guide plate body.

In this way, a portion of the light that enters the light guide plate body from the light incident surface S of the light guide plate body enters at least one optical fiber from the first end 21a thereof. Light entering each optical fiber is totally reflected in the optical fiber (such as the optical path shown by arrows in FIG. 4A), thereby transmitting the light entering the optical fiber to the first region X (i.e., the dark region P or the blocking region Q), and increasing the amount of the light traveling to the first region X (i.e., the dark region P or the blocking region Q). Further, the luminance of the first regions X (i.e., the dark regions P or the blocking regions Q) is improved, and the uniformity of the luminance of the backlight propagating through the light guide plate is also improved, which is conducive to improving the display quality of the display device.

In some embodiments, as shown FIGS. 2A and 2B, each optical fiber 21 further has a second end 21b. The second end 21b of the optical fiber 21 is proximate to a first region X (i.e., a dark region P or a blocking region Q of the light guide plate body, or is located in a first region X (i.e., a dark region P or a blocking region Q) of the light guide plate body. In this way, when the light entering each optical fiber 21 is emitted from the second end 21b of the optical fiber 21, the light enters the first region X (i.e., the dark region P or the blocking region Q) proximate to the second end 21b of the optical fiber 21, or, the light enters the first region X (i.e., the dark region P or the blocking region Q) where the second end 21b of the optical fiber 21 is located, so that the amount of the light entering the first region X is increased. Therefore, the luminance of the first region X is improved, and the uniformity of the luminance of the backlight propagating through the light guide plate is also improved, which is conducive to improving the display quality of the display device.

Figure 2C:
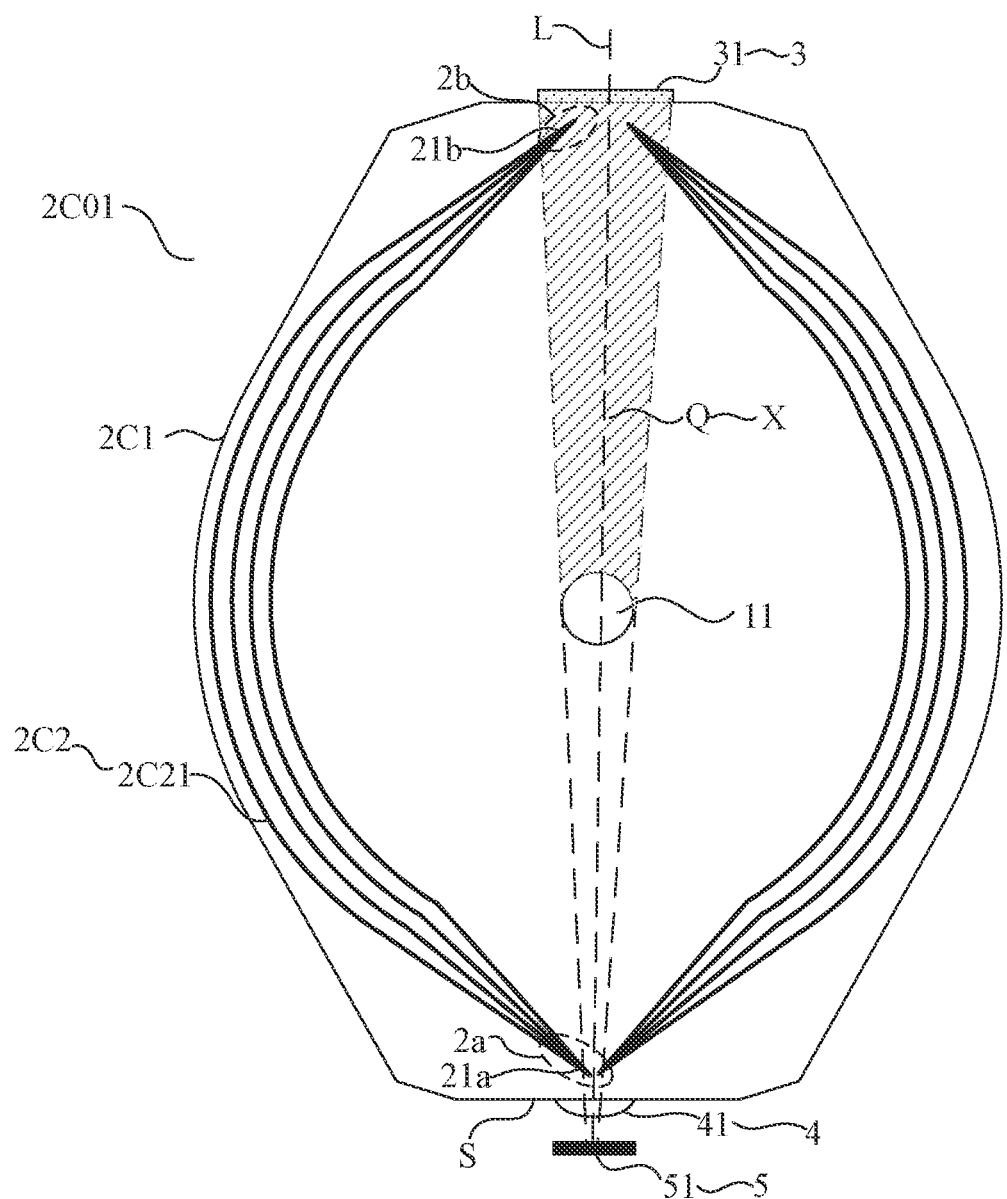
FIG. 2C is a schematic diagram showing yet another light guide plate and a light source, in accordance with some embodiments of the present disclosure.
Figure 2D:
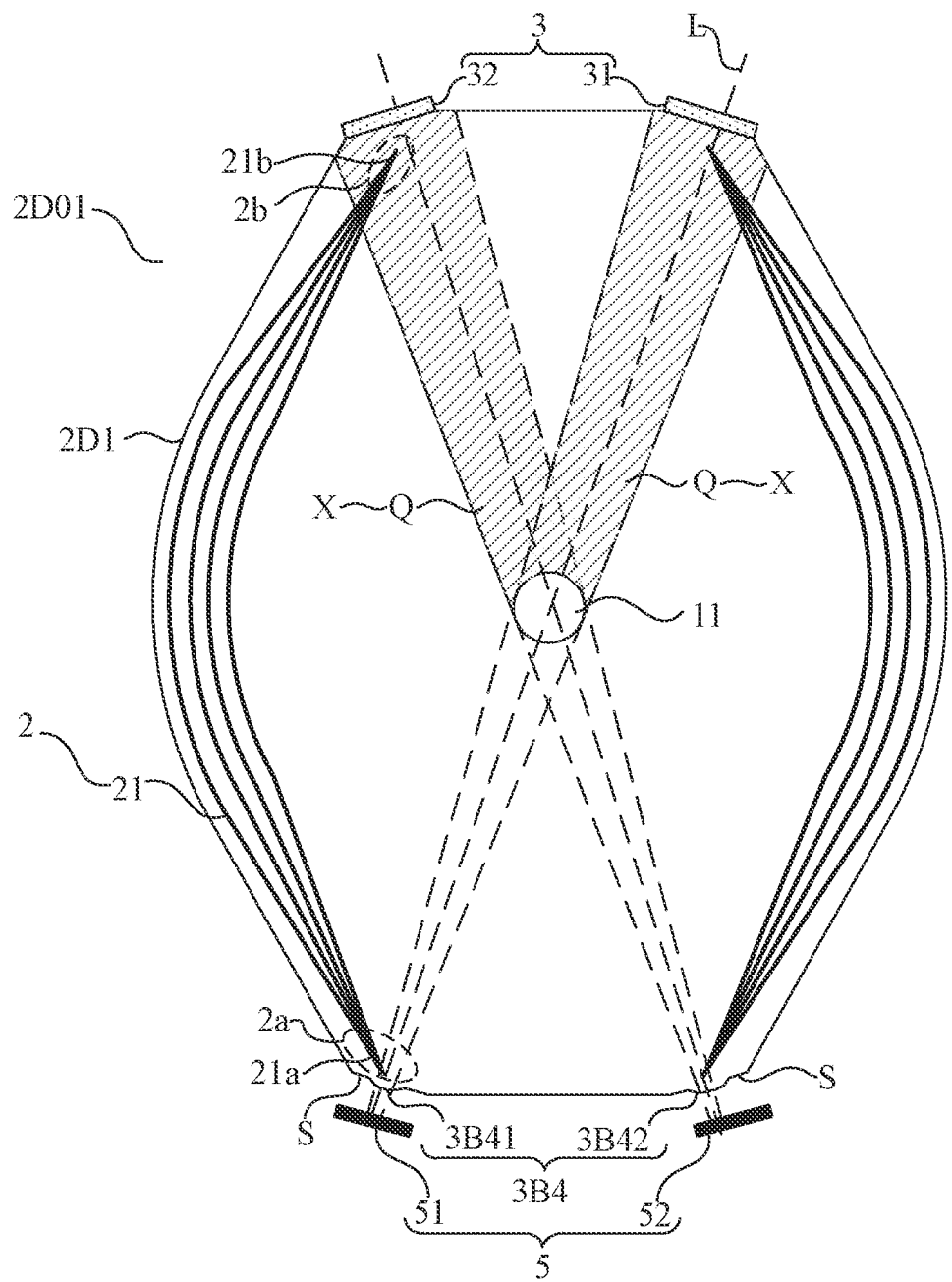
FIG. 2D is a schematic diagram showing yet another light guide plate and light sources, in accordance with some embodiments of the present disclosure.
Figure 2E:
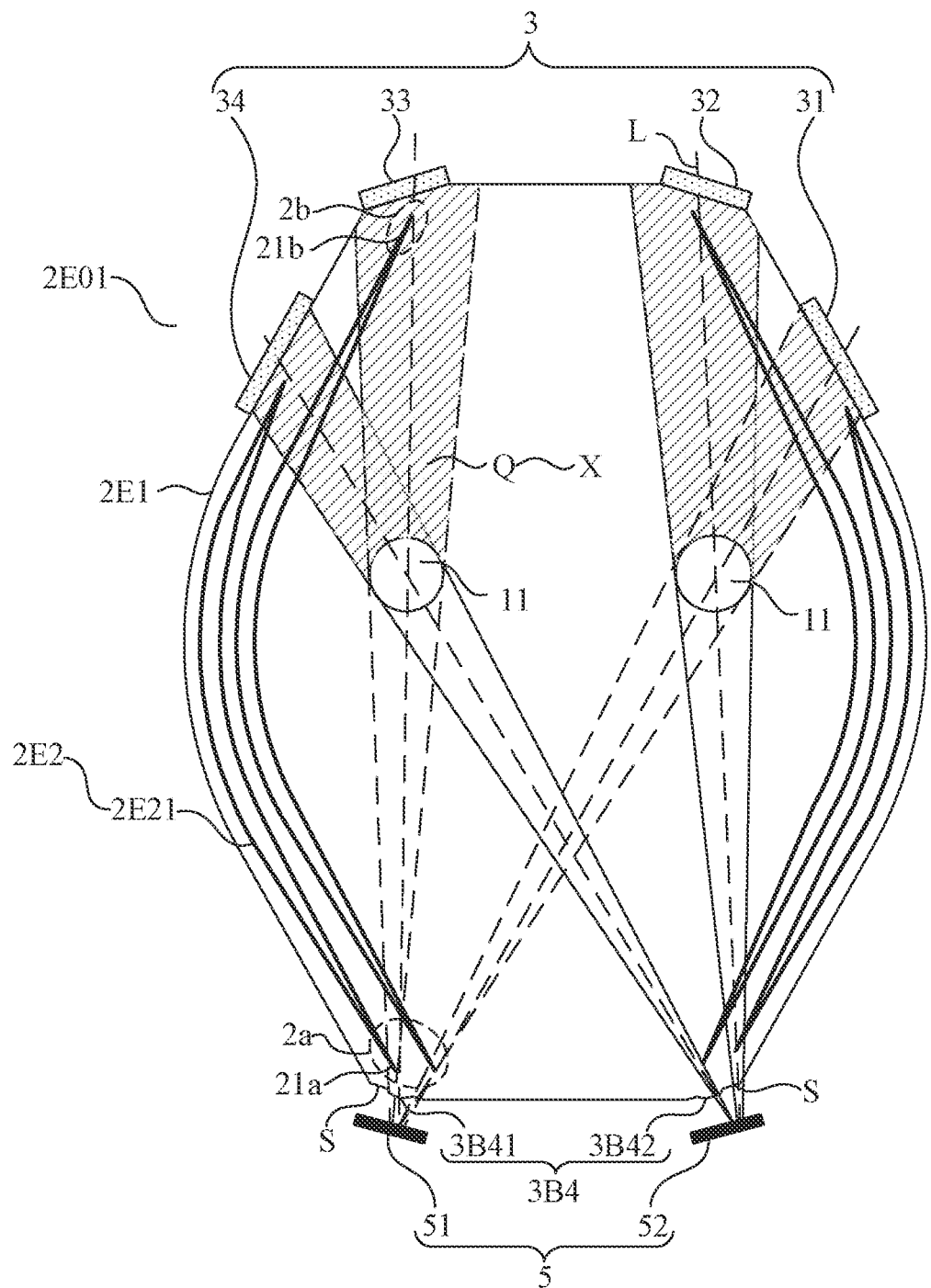
FIG. 2E is a schematic diagram showing yet another light guide plate and light sources, in accordance with some embodiments of the present disclosure.

In some other embodiments, as shown in FIG. 2C, FIGS. 2D and 2E, each optical fiber further has a second end 21b. The light guide plate further includes at least one light reflecting member 3 disposed on a side face of the light guide plate body away from the light incident surfaces. Each light reflecting member 3 is proximate to the second end(s) 21b of one or more optical fibers. Each light reflecting member 3 is configured to reflect light that is emitted from the second end 21b of the optical fiber adjacent to the light reflecting member 3 to the first region X (i.e., the dark region P or the blocking region Q) of the light guide plate body adjacent to each light reflecting member 3. Herein, a case where the first regions X are the blocking regions Q in the light guide plate body is shown in FIGS. 2C, 2D, and 2E.

That is to say, the second end 21b of each optical fiber may not be directly disposed at a position proximate to the first region X, or may not be directly disposed in the first region X, and may be disposed at a position proximate to a light reflecting member 3. In this way, after each optical fiber transmits the light to the light reflecting member 3 adjacent to the second end 21b of the optical fiber, the light is reflected to a first region X adjacent to the light reflecting member 3 in the light guide plate body by the light reflecting member 3 adjacent to the second end 21b of the optical fiber, which increases the amount of the light traveling to the first region X. Therefore, the luminance of the first region X is improved, and the uniformity of the luminance of the backlight propagating through the light guide plate is also improved, which is conducive to improving the display quality of the display device.

For example, each light reflecting member 3 includes a metal layer disposed on the side face of the light guide plate body away from the light incident surfaces. For example, the metal layer includes a metal-plated layer. For example, the metal-plated layer may be a silver-plated layer or a mercury-plated layer. The metal layer is a metal film attached to the side face of the light guide plate body away from the light incident surfaces. For example, the metal-plated layer is a metal film plated on the side face of the light guide plate body away from the light incident surfaces. Therefore, space occupied by the metal layer may be ignored, a volume of the light guide plate may be reduced, and a volume of a smart wearable product to which the light guide plate is applied is further reduced.

In some embodiments, the at least one light reflecting member 3 may also be light reflecting sheet(s) adhered to a side wall of the light guide plate body away from the light incident surfaces. For example, the light reflecting sheet may be any one or more of a silver light reflecting sheet, a white light reflecting sheet, or an ESR-65 light reflecting sheet.

As for the light guide plate including the at least one light reflecting member 3, a second end 21b of an optical fiber may extend to the light reflecting member 3 adjacent to the second end 21b of the optical fiber 211, and directly contact the adjacent light reflecting member 3, There may also be a small distance between the second end 21b of the optical fiber and the adjacent light reflecting member 3, and the distance may be less than 0.1 mm. The distance between the second end 21b of the optical fiber and the adjacent light reflecting member 3 is very small, so that as much light as possible of light propagating through the optical fiber may travel to the adjacent light reflecting member 3, and then is reflected by the adjacent light reflecting member 3 to a first region X.

In some embodiments, the number of the optical fibers proximate to each light reflecting member 3 is equal. In this way, an amount of light traveling to each light reflecting member 3 by the optical fibers proximate to the light reflecting member 3 is equal (or approximately equal), which makes that an amount of light reflected by each light reflecting member 3 to a first region X adjacent to the light reflecting member 3 is equal (or approximately equal), and a degree by which the luminance of each first region X increases is equal (or approximately equal). Further, the uniformity of the luminance of the backlight propagating through the light guide plate is improved, which is conducive to improving the display quality of the display device.

Figure 3A:
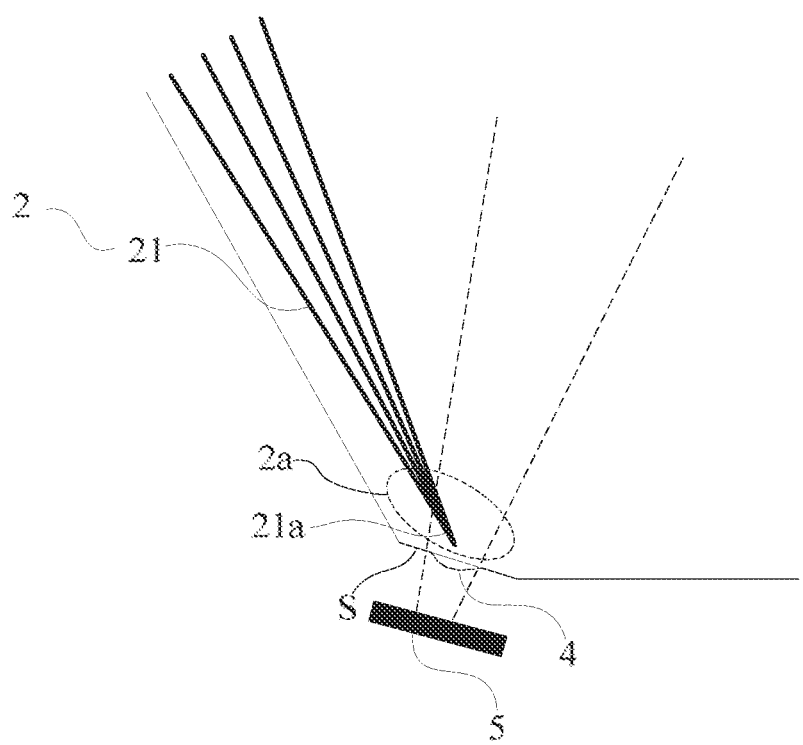
FIG. 3A is a schematic diagram of a lens structure of a light guide plate, in accordance with some embodiments of the present disclosure.
Figure 3B:
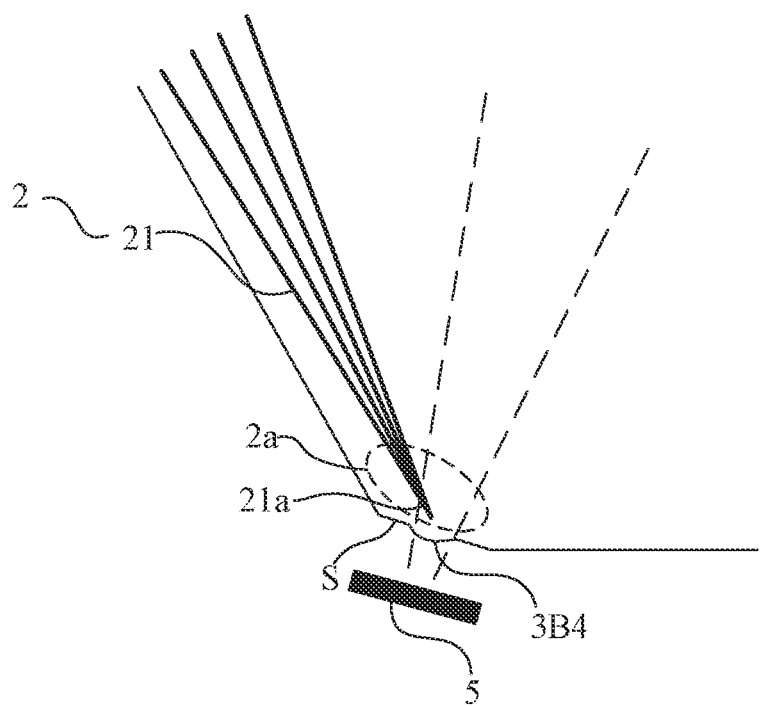

In some embodiments, as shown in FIGS. 2A to 2E, 3A and 3B, the light guide plate further includes at least one lens structure 4. The at least one lens structure 4 is disposed on the light incident surface(s) S of the light guide plate body 19 (as shown in FIG. 3A). That is, the at least one lens structure 4 is at least one separate component other than the light guide plate body in the light guide plate. Or, the at least one lens structure 3B4 is composed of outward protrusion(s) of the light guide plate body at the light incident surface(s) S (as shown in FIG. 3B). That is, the at least one lens structure 4 is at least one portion of the light guide plate body. That is, the at least one lens structure 3B4 and the light guide plate body are of an integrated structure.

Each lens structure is configured to converge at least a portion of the light that enters the light guide plate body to a focus of the lens structure or a position near the focus of the lens structure. The focus of each lens structure or the position near the focus of each lens structure is provided with first end(s) 2a of one or more light transmitting components.

In this way, since the light incident surface S of the light guide plate body is provided with a lens structure, a portion of the light that enters the light guide plate body is converged at the focus of the lens structure or the position near the focus of the lens structure. By arranging the first end 2a of each light transmitting component at a focus of a lens structure adjacent to the first end 2a of the light transmitting component or a position near the focus of the adjacent lens structure, an amount of the light entering each light transmitting component is increased, and the amount of the light propagating through each light transmitting component to a light reflecting member 3 adjacent to the light transmitting component is further increased. As a result, the luminance of the first region X (i.e., the dark region P or the blocking region Q) adjacent to the light reflecting member 3 is further improved, and the uniformity of the luminance of the backlight propagating through the light guide plate is further improved.

In the embodiments of the present disclosure, a specific structure of each lens structure is not limited, as long as the at least one lens structure Hill is capable of converging the light. For example, the lens structure may be a convex lens, a Fresnel lens, or the like.

In some embodiments, as shown in FIGS. 2A to 2E, the at least one light transmitting component included in the light guide plate is arranged at an edge of the light guide plate body. In this way, an obstruction to the transmission of the light in the light guide plate body may be reduced, thereby reducing a loss of the light in a case where the light travels in the light guide plate body and increasing the amount of the light traveling to the first region(s) X (i.e., the dark region(s) P or the blocking region(s) Q) in the light guide plate body. Further, the luminance of the first region(s) X is improved, and the uniformity of the luminance of the backlight propagating through the light guide plate is also improved.

Figure 4A:
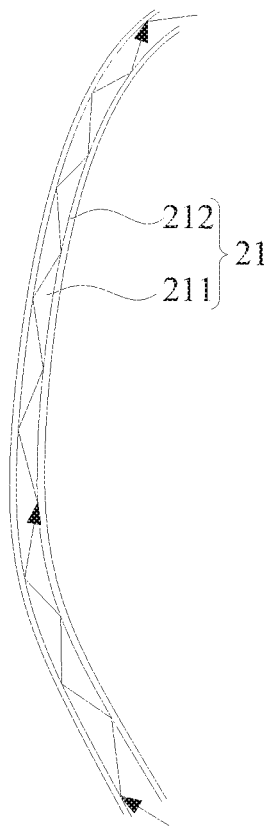
FIG. 4A is a schematic cross-sectional diagram of an optical fiber taken along an axial direction, in accordance with some embodiments of the present disclosure.
Figure 4B:
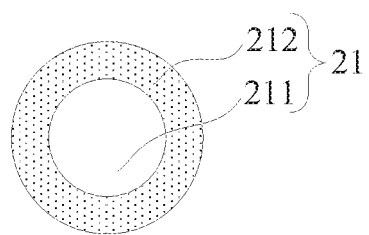
FIG. 4B is a schematic cross-sectional diagram of an optical fiber taken along a direction perpendicular to an axis, in accordance with some embodiments of the present disclosure.

In some embodiments, as shown in FIGS. 4A and 4B, each optical fiber 21 includes an inner core 211 and a cladding 212 covering an outer surface of the inner core 211. A refractive index of the inner core 211 and a refractive index of the cladding 212 are both greater than a refractive index of the light guide plate body 1. As a result, the light entering the optical fiber 21 may be totally reflected in the optical fiber, so that the light propagates in the optical fiber 21. Further, the refractive index of the inner core 211 is greater than the refractive index of the cladding 212, and the refractive index of the cladding 212 is greater than the refractive index of the light guide plate body 1, so that the light propagates in the inner core 211 in a total reflection manner (as shown by the optical path in FIG. 4A). For example, the cladding 212 is a glass envelope. A refractive index of the glass envelope is less than the refractive index of the inner core 211.

Compared with a conventional optical fiber, in some embodiments of the present disclosure, the light guide plate body at a periphery of each optical fiber may be used as a replacement for a coating layer and an outer protective layer of the conventional optical fiber, which makes a structure of the optical fiber in the embodiments of the present disclosure simpler, thereby reducing the cost of the optical fiber.

In addition, the optical fiber has no coating layer and no outer protective layer, and the inner core 211 and the cladding 212 of the optical fiber are both made of a material with a high light transmittance. For example, the cladding 212 is made of glass, and the inner core 211 is made of quartz. The optical fiber may be regarded as transparent. Therefore, the optical fiber will not block the transmission of the light in the light guide plate body.

Further, since the optical fiber is regarded as transparent, there may be no limitation on an arrangement manner of the optical fiber in the light guide plate body. The optical fiber may be disposed in an edge region or a non-edge region (such as a middle region) of the light guide plate body.

Figure 5:
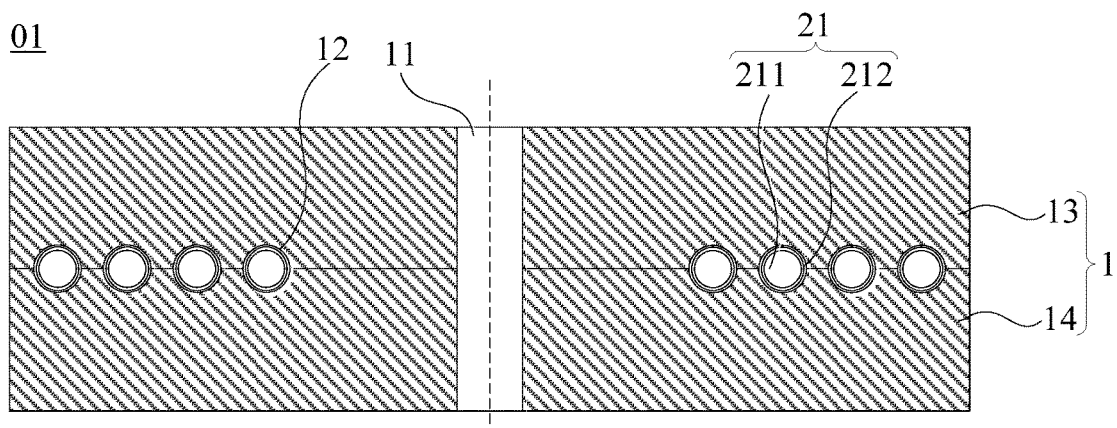
FIG. 5 is a schematic cross-sectional diagram of a light guide plate, in accordance with some embodiments of the present disclosure.

In some embodiments, as shown in FIG. 5, the light guide plate body 1 includes at least one channel 12 therein. Each channel 12 is provided with at least one light transmitting component 2 therein. For example, each channel 12 is provided with a single light transmitting component 2 therein. In this way, each channel 12 forms a spatial protection for the at least one light transmitting component 2 disposed in the channel 12, and the at least one light transmitting component 2 is prevented from being damaged due to being squeezed during a process of forming the light guide plate body 1.

As shown in FIGS. 2A to 2E and 6, some embodiments of the present disclosure provide a backlight module M. The backlight module M includes the light guide plate according to the above embodiments, and at least one light source 5 disposed at the light incident surface(s) S of the light guide plate body of the light guide plate. The at least one light source 5 is configured to provide light for the light guide plate body.

The at least one light source 5 may be one or more of a light emitting diode (LED), a laser source, a cold cathode fluorescent lamp (CCFL), an electro luminescence (EL), or an incandescent lamp.

Based on this, a portion of the light that enters from the light incident surface(s) S of the light guide plate body travels to the first region(s) X (herein, the first region(s) X being the dark region(s) P or the blocking region(s) Q) by the light transmitting component(s) in the light guide plate, and the amount of the light entering the first region(s) X is increased, thereby increasing the luminance of the first region(s) X. Further, a uniformity of luminance of backlight provided by the backlight module M is also improved, which is conducive to improving a display quality of a display device to which the backlight module M is applied.

In some embodiments, as shown in FIGS. 2C and 2D, in a case where the light guide plate includes at least one lens structure, the at least one lens structure is located between the at least one light source 5 and the light incident surface(s) S of the light guide plate body. In this way, a portion of light emitted by a light source 5 corresponding to each lens structure may be converged by the lens structure, and then travels to the first region X (i.e., the dark region P or the blocking region Q) by light transmitting component(s) adjacent to the lens structure in the light guide plate. As a result, the amount of the light entering the first region X is increased.

For example, as shown in FIG. 2C, the light guide plate 2C01 includes one lens structure 4, which is referred to as a first lens structure 41. The backlight module M includes one light source 5, which is referred to as a first light source 51. The first lens structure 41 is located at the light incident surface S of the light guide plate body 2C1 and disposed between the first light source 51 and the light incident surface 5, so that the first lens structure 41 is located within a transmission range of light emitted by the first light source 51.

For example, as shown in FIG. 2D, the light guide plate 2D01 includes two lens structures 3B4, which are a first lens structure 3B41 and a second lens structure 3B42. The backlight module M includes two light sources 5, which are a first light source 51 and a second light source 52. The first lens structure 3B41 is disposed at a side of the first light source 51 facing a light incident surface S of the light guide plate body 2D1, so that the first lens structure 3B41 is located within a transmission range of light emitted by the first light source 51. The second lens structure 3B42 is disposed at a side of the second light source 52 facing a light incident surface S of the light guide plate body 2D1, so that the second lens structure 3B42 is located within a transmission range of light emitted by the second light source 52.

In some embodiments, as shown in FIGS. 2C, 2D and 2E, in a case where the light guide plate includes at least one light reflecting member 3, and the light guide plate body includes at least one first via hole 11, a light reflecting member 3 is disposed on an extension line L of a connection line between any light source 5 and any first via hole 11, and is disposed at a side of the first via hole 11 away from the light source 5.

Based on this, in a transmission process of light, any first via hole 11 blocks light emitted by any light source 5, and a blocking region Q is formed at a side of the first via hole 11 away from the light source 5. Therefore, as for at least one light source 5, at least one blocking region Q is formed due to each first via hole 11, and the number of the at least one blocking region Q is equal to the number of the at least one light source 5.

A light reflecting member 3 is disposed on an extension line L of a connection line between any light source 5 and any first via hole 11, and is disposed at a side of the first via hole 11 away from the light source 5. Therefore, a light reflecting member 3 on an extension line L of a connection line between each light source 5 and any first via hole 11 may reflect the light propagating through the optical fiber(s) 21 adjacent to the light reflecting member 3 to a blocking region Q formed due to each light source 5 and the first via hole 11. As a result, the amount of the light entering the blocking region Q is increased, and the luminance of each blocking region Q is improved, and the uniformity of the luminance of the backlight propagating through the light guide plate is also improved.

For example, as shown in FIG. 2C, the light guide plate 2C01 includes one light reflecting member 3, which is referred to as a first light reflecting member 31. The light guide plate body 2C1 includes one first via hole 11. The first light reflecting member 31 is disposed on an extension line L of a connection line between the first light source 51 and the first via hole 11, disposed at a side of the first via hole 11 facing away from the first light source 51, and is disposed on the side face of the light guide plate body 2C1 away from the light incident surface.

For example, as shown in FIG. 2D, the light guide plate 2D01 includes two light reflecting members 3, which are a first light reflecting member 31 and a second light reflecting member 32. The light guide plate body 2D1 includes one first via hole 11. The first light reflecting member 31 is disposed on an extension line L of a connection line between the first light source 51 and the first via hole 11, and is disposed at a side of the first via hole 11 away from the first light source 51. The second light reflecting member 32 is disposed on an extension line L of a connection line between the second light source 52 and the first via hole 11, and is disposed at a side of the first via hole 11 away from the second light source 52.

For example, as shown in FIG. 2E, the light guide plate 2E01 includes four light reflecting members 3, which are a first light reflecting member 31, a second light reflecting member 32, a third light reflecting member 33, and a fourth light reflecting member 34. The light guide plate body 2E1 has two first via holes 11. As for one of the first via holes 11, the first light reflecting member 31 is disposed on an extension line L of a connection line between the first light source 51 and the first via hole 11, and is disposed at a side of the first via hole 11 away from the first light source 51. The second light reflecting member 32 is disposed on an extension line L of a connection line between the second light source 52 and the first via hole 11, and is disposed at a side of the first via hole 11 away from the second light source 52. As for the other first via hole 11, the third light reflecting member 33 is disposed on an extension line L of a connection line between the first light source 51 and the other first via hole 11, and is disposed at a side of the other first via hole 11 away from the first light source 51. The fourth light reflecting member 34 is disposed on an extension line L of a connection line between the second light source 52 and the other first via hole 11, and is disposed at a side of the other first via hole 11 away from the second light source 52.

In some embodiments, the light guide plate has one first via hole 11, the backlight module M includes at least two light sources 5, and the light guide plate includes at least two light reflecting members 3. The at least two light reflecting members 3 are respectively disposed on extension lines L of connection lines between the at least two light sources 5 and the first via hole 11.

For example, as shown in FIG. 2D, the backlight module M includes two light sources 5, the light guide plate 2D01 includes two light reflecting members 3, and one first via hole 11 included in the light guide plate body 2D1 is located at a center of the light guide plate body 2D1. The two light sources 5 include the first light source 51 and the second light source 52. The two light reflecting members 3 include the first light reflecting member 31 and the second light reflecting member 32. The first light reflecting member 31 is located on the extension line L of the connection line between the first light source 51 and the first via hole 11, and the second light reflecting member 32 is located on the extension line L of the connection line between the second light source 52 and the first via hole 11.

In a case where the light guide plate includes a plurality of optical fibers 21, a portion of the light that is emitted by the first light source 51 and enters the light guide plate body propagates through a portion of the plurality of optical fibers 21 to the second light reflecting member 32, so that the portion of the light is reflected to a blocking region Q formed due to the second light source 52 and the first via hole 11 by the second light reflecting member 32. A portion of the light that is emitted by the second light source 52 and enters the light guide plate body propagates through a remaining portion of the plurality of optical fibers 21 to the first light reflecting member 31, so that the portion of the light is reflected to a blocking region Q formed due to the first light source 51 and the first via hole 11 by the first light reflecting member 31.

Figure 6:
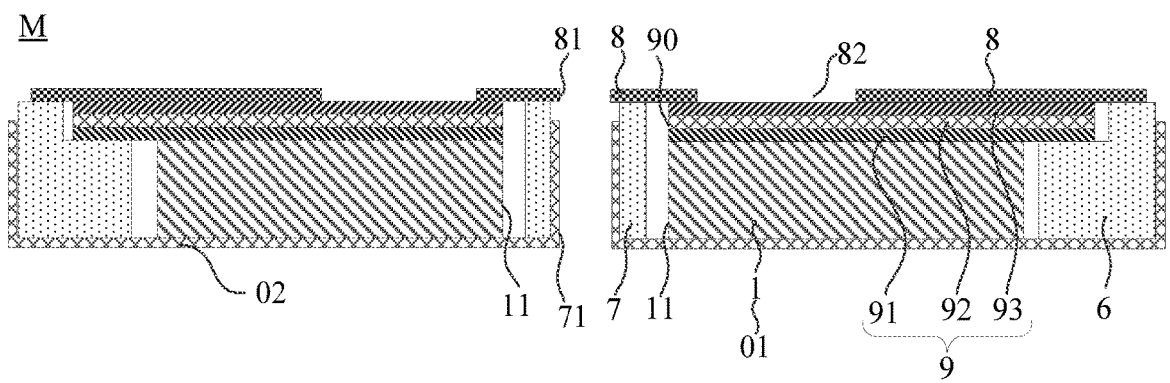
FIG. 6 is a schematic cross-sectional diagram of a backlight module; in accordance with some embodiments of the present disclosure.

In some embodiments, as shown in FIG. 6, in the case where the light guide plate 01 has at least one first via hole 11, the backlight module M further includes a back plate 02, an outer plastic frame 6, and at least one inner plastic frame 7.

The light guide plate 01 and the at least one light source 5 are disposed on a side of the back plate 02. For example, the back plate 02 has a groove structure. The light guide plate 01 and the at least one light source 5 are disposed in the groove structure of the back plate 02.

In a direction perpendicular to a thickness of the back plate, the outer plastic frame 6 is disposed outside the light guide plate 01 and the at least one light source 5. The at least one inner plastic frame 7 is disposed in the at least one first via hole 11 that the light guide plate 01 has in one-to-one correspondence, and each inner plastic frame 7 has a second via hole 71. The outer plastic frame 6 and the at least one inner plastic frame 7 play a role of supporting and protecting the light guide plate 01.

In some embodiments, the backlight module M further includes a light-shielding adhesive 8 and an optical film layer 9.

The light-shielding adhesive 8 is provided at a side of the at least one inner plastic frame 7 and the outer plastic frame 6 facing away from the back plate. The light-shielding adhesive 8 has an opening 82 and at least one third via hole 81. An orthographic projection of the opening 82 on the back plate 02 is within an orthographic projection of the light guide plate body 1 on the back plate 02. The at least one third via hole 81 is communicated with the second via hole 71 of the at least one inner plastic frame 7 in one-to-one correspondence. In this way, by using the light-shielding adhesive 8 to shield the outer plastic frame 6 and the inner plastic frame 7, the light propagating through the light guide plate 01 may only be emitted from the opening 82, thereby avoiding a problem of light leakage of the backlight module M that is caused by a fact that the light propagating through the light guide plate 01 is emitted from non-opening regions (for example, a region where the outer frame 6 is located and a region where the inner frame 7 is located).

The optical film layer 9 is disposed between the light-shielding adhesive 8 and the light guide plate 01. The optical film layer 9 includes at least one of a diffusion plate 91, a lower prism sheet 92, or an upper prism sheet 93 that are sequentially stacked in a direction from the light guide plate 01 to the light-shielding adhesive 8 and perpendicular to the light guide plate 01. The optical film layer 9 has at least one fourth via hole 90, and the at least one fourth via hole 90 is communicated with the second via hole 71 of the at least one inner plastic frame 7 in one-to-one correspondence. For example, the optical film layer 9 includes the diffusion plate 91, the lower prism sheet 92, and the upper prism sheet 93. In this way, by using the diffusion plate 91, the lower prism sheet 92 and the upper prism sheet 93, a uniformity and a collimation of the light propagating through the light guide plate 01 may be further improved.

A second via hole 71, a third via hole 81, and a fourth via hole 90 in the backlight module M may correspond to each other and have a same diameter (or an approximately same diameter), and together form a through hole. A structure such as a rotating shaft 300 may be disposed in the through hole.

Figure 7:
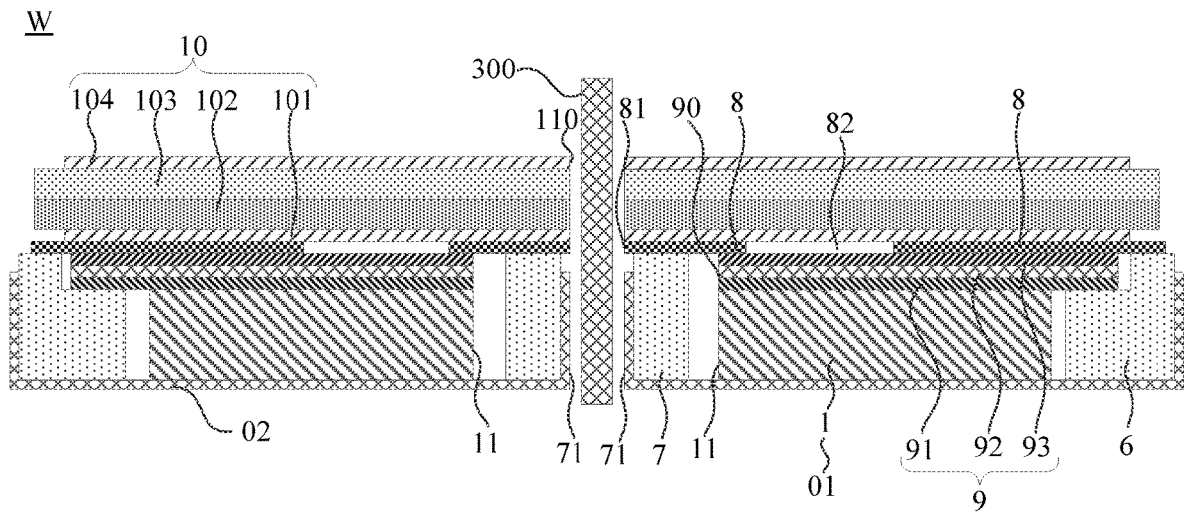
FIG. 7 is a schematic cross-sectional diagram of a display device, in accordance with some embodiments of the present disclosure.

As shown in FIG. 7, some embodiments of the present disclosure provide a display device W, The display device \N includes the backlight module M according to the above embodiments, and a display panel 10 disposed on a light exit side of the backlight module M. The display panel 10 has at least one fifth via hole 110. The at least one fifth via hole 110 is communicated with the second via hole(s) 71 of the at least one inner plastic frame 7 in the backlight module M in one-to-one correspondence, so that a structure such as the rotating shaft 300 may pass through a fifth via hole 110.

For example, in a direction away from the backlight module M, the display panel 10 includes a lower polarizer 101, an array substrate 102, a color filter substrate 103 and an upper polarizer 104 that are sequentially stacked. A specific structure of the display panel 10 is not limited in the present disclosure.

Beneficial effects achieved by the display device \N provided by some embodiments of the present disclosure are the same as beneficial effects achieved by the backlight module M provided by the above embodiments, and details are not described herein.

As shown in FIG. 8, some embodiments of the present disclosure provide a terminal F. The terminal F includes the display device W according to the above embodiments. The terminal F may be a smart wearable product, such as a watch, a wristband, glasses, a helmet, or a headband. For example, the display device W is provided with at least one via hole. One of the at least one via hole is provided with the rotating shaft 300 therein, so as to facilitate installation of components such as mechanical pointers.

Beneficial effects achieved by the terminal provided by the embodiments of the present disclosure are the same as the beneficial effects achieved by the display device provided by the above embodiments, and details are not described herein.

Figure 10A:
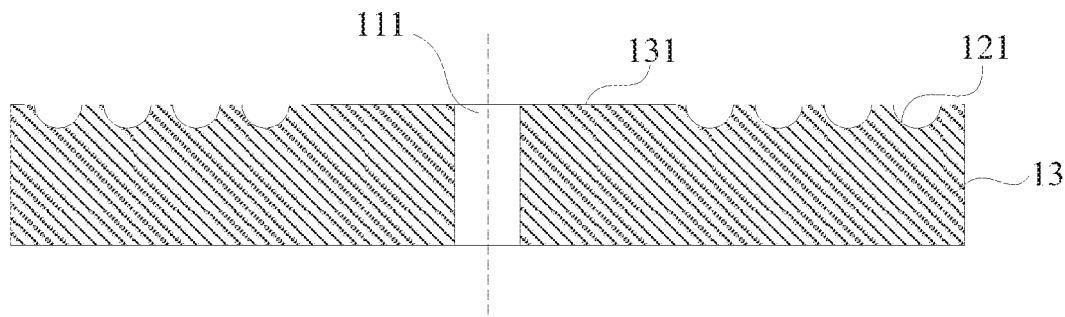

Some embodiments of the present disclosure provide a method for manufacturing a light guide plate, which is configured to manufacture the light guide plate according to the above embodiments. As shown in FIGS. 9 and 10A to 100, the manufacturing method includes S100 to S300.

In S100, a first body layer 13 is formed. A main surface 131 of the first body layer 13 has at least one first groove 121, and the first body layer 13 includes at least one first through hole 111.

In s200, at least one optical fiber is placed in each first groove 121. For example, one optical fiber is placed in each first groove 121.

In S300, a second body layer 14 is formed on a side of the first body layer 13 on which the at least one optical fiber has been placed.

The second body layer 14 has at least one second through hole 112. The at least one first through hole 111 of the first body layer 13 is communicated with the at least one second through hole 112 in one-to-one correspondence to form at least one first via hole 11. A main surface 141 of the second body layer 14 facing the first body layer 13 has at least one second groove 122. The at least one first groove 121 is matched with the at least one second groove 122 in one-to-one correspondence to form at least one channel 12.

The light guide plate body of the light guide plate is composed of the first body layer 13 and the second body layer 14.

In this way, a portion of the light that enters from the light incident surface(s) S of the light guide plate body propagates through the at least one optical fiber 21 to the blocking region(s) Q formed due to a fact that the first via hole(s) 11 and the rotation shaft 300 block the transmission of light in the light guide plate, and the amount of the light traveling to the blocking region(s) Q is increased. Therefore, the luminance of the blocking region(s) Q is improved, and the uniformity of the luminance of the backlight propagating through the light guide plate is further improved, which is conducive to improving the display quality of the display device.

In a process of manufacturing the light guide plate, as for a process of forming the first body layer 13 and the second body layer 14, a material of the first body layer 13 and a material of the second body layer 14 may be injected into a mold, and an injection molding process is used to form the first body layer 13 and the second body layer 14. After the first body layer 13 is formed, an appropriate number of optical fiber may be placed on the first body layer 13. In a case where one optical fiber 21 is placed in each first groove 121 of the light guide plate that needs to be manufactured, the optical fibers fall into the first grooves 121 of the first body layer 13 in one-to-one correspondence through a continuous slight vibration. Then, excess optical fibers on a surface of the first body layer 13 are removed. Thereafter, the first body layer 13 with the optical fibers is placed into the mold, and the second body layer 14 is formed by using the injection molding process.

In the description of the above embodiments, specific features, structures, materials or characteristics may be combined in any suitable manner in any one or more embodiments or examples.

The forgoing descriptions are merely specific implementation manners of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

The Reference Characters in the Drawings are Described as Follows:
01, 1B01, 2A01, 2B01, 2C01, 2D01, 2E01 light guide plate
02 back plate
1, 2B1, 2C1, 2D1, 2E1 light guide plate body
10 display panel
101 lower polarizer
102 array substrate
103 color filter substrate
104 upper polarizer
11 first via hole
110 fifth via hole
111 first through hole
112 second through hole
12 channel
121 first groove
122 second groove
13 first body layer
131, 141 main surface
14 second body layer
2, 2C2, 2E2 light transmitting component
2a first end of light transmitting component
2b second end of light transmitting component
21, 2C21, 2E21 optical fiber
21a first end of optical fiber
21b second end of optical fiber
211 inner core
212 cladding
3 light reflecting member
300 rotating shaft
31 first light reflecting member
32 second fight reflecting member
33 third light reflecting member
34 fourth light reflecting member
4, 3B4 lens structure
41, 3B41 first lens structure
42, 3B42 second lens structure
5 light source
51 first light source
52 second light source
6 outer plastic frame
7 inner plastic frame
71 second via hole
8 light-shielding adhesive
81 third via hole
82 opening
9 optical film layer
91 diffusion date
92 lower prism sheet
93 upper prism sheet
P dark region
Q blocking region
X first region
S light incident surface
L extension line
M backlight module
W display device
F terminal

What is claimed is:

1. A light guide plate, comprising:
a light guide plate body having at least one light incident surface;
at least one light transmitting component disposed in the light guide plate body, the at least one light transmitting component configured to transmit a portion of light from the light incident surface to a first region of the light guide plate body; and
at least one first via hole,
wherein the first region is located at a side of the at least one first via hole facing away from the light incident surface.

2. The light guide plate according to claim 1, wherein the light transmitting component includes at least one optical fiber; each optical fiber comprises:
a first end configured to receive a portion of light from the light incident surface, and a second end configured to output light received by the first end.

3. The light guide plate according to claim 1, wherein the light transmitting component comprises:
   a first configured to receive the portion of light from the light incident surface; and
   a second end located proximate the first region and configured to output the portion of light received by the first end towards the first region.

4. The light guide plate according to claim 3, further comprising:
   at least one lens structure disposed on the light incident surface of the light guide plate body,
   wherein each lens structure is configured to converge at least a portion of the light that enters the light guide plate body to a position substantially at the first ends of one or more light transmitting components.

5. The light guide plate according to claim 3, further comprising at least one channel provided in the light guide plate body, and each channel is provided with at least one light transmitting component therein.

6. The light guide plate according to claim 3, wherein at least one of light transmitting components is arranged at an edge of the light guide plate body.

7. The light guide plate according to claim 2, wherein the optical fiber includes an inner core; and a cladding covering an outer surface of the inner core; and
   a refractive index of the inner core and a refractive index of the cladding are both greater than a refractive index of the light guide plate body.

8. The light guide plate according to claim 2, further comprising:
   at least one light reflecting member disposed on a side face of the light guide plate body and proximate the second end of the optical fiber,
   wherein the light reflecting member is configured to reflect light emitted from the second end of the optical fiber to the first region.

9. The light guide plate according to claim 8, wherein each light reflecting member includes a metal layer.

10. The light guide plate according to claim 8, wherein the at least one light reflecting member includes a plurality of light reflecting members, the at least one light transmitting component includes a plurality of light transmitting components, and a number of optical fibers corresponding to each light reflecting member is equal.

11. A backlight module, comprising:
    the light guide plate according to claim 1; and
    at least one light, source disposed at the at least one light incident surface of the light guide plate body of the light guide plate, and the at least one light source is configured to provide light for the light guide plate body.

12. The backlight module according to claim 11; wherein the light guide plate includes at least one lens structure, the at least one lens structure is located between the at least one light source and the at least one light incident surface of the light guide plate body.

13. The backlight module according to claim 11, wherein the light guide plate includes at least one light reflecting member and the light guide plate body has at least one first via hole, a light reflecting member is disposed on an extension line of a connection line between a light source and a first via hole; is disposed at a side of the first via hole facing away from the light source, and is disposed on a side face of the light guide plate body away from the at least one light incident surface.

14. The backlight module according to claim 13, wherein the light guide plate has one first via hole, the backlight module includes at least two light sources, the light guide plate includes at least two light reflecting members, and the at least two light reflecting members are respectively disposed on extension lines of connection lines between the at least two light sources and the first via hole, and is disposed on the side face of the light guide plate body away from the at least one light incident surface.

15. The backlight module according to claim 11, wherein the light guide plate has at least one first via hole, the backlight module further comprises:
    a back plate, wherein the light guide plate and the at least one light source are disposed on the back plate;
    an outer plastic frame disposed outside the light guide plate and the at least one light source in a direction perpendicular to a thickness of the back plate and disposed on the back plate; and
    at least one inner plastic frame disposed in the at least one first via hole in one-to-one correspondence, wherein each inner plastic frame has a second via hole.

16. The backlight module according to claim 15, further comprising:
    a light-shielding adhesive disposed at a side of the inner plastic frame and the outer plastic frame facing away from the back plate, wherein the light-shielding adhesive has an opening and at least one third via hole, an orthographic projection of the opening on the back plate is within an orthographic projection of the light guide plate body on the back plate, and the at least one third via hole is communicated with at least one second via hole in one-to-one correspondence; and
    an optical film layer disposed between the light-shielding adhesive and the light guide plate, wherein the optical film layer includes at least one of a diffusion plate, a lower prism sheet, or an upper prism sheet that are sequentially stacked in a direction of a thickness of the light guide plate; and the optical film layer has at least one fourth via hole, and the at least one fourth via hole is communicated with at least one second via hole in one-to-one correspondence.

17. A display device, comprising:
    the backlight module according to claim 15; and
    a display panel disposed on a light exit side of the backlight module, wherein the display panel has at least one fifth via hole, and the at least one fifth via hole is communicated with at least one second via hole in one-to-one correspondence.

18. A terminal, comprising the display device according to claim 17, wherein one of the at least one fifth via hole is provided with a rotating shaft therein.

19. A method for manufacturing a light guide plate, comprising:
    forming a first body layer including at least one first through hole, wherein a main surface of the first body layer has at least one first groove;
    placing at least one light transmitting component in each first groove; and
    forming a second body layer including at least one second through hole on a side of the first body layer on which the at least one light transmitting component has been placed,
    wherein a main surface of the second body layer facing the first body layer has at least one second groove, and the at least one first groove is matched with the at least one second groove in one-to-one correspondence;

forming at least one first via hole b communicating the at least one first through hole with the at least one second through hole in one-to-one correspondence, wherein a first region is located at a side of the at least one first via hole facing away from at least one light incident surface;

wherein the first body layer and the second body layer forms the light guide plate body.

* * * * *

UNITED STATES PATENT AND TRADEMARK OFFICE
CERTIFICATE OF CORRECTION

PATENT NO. : 11,086,067 B2
APPLICATION NO. : 16/643211
DATED : August 10, 2021
INVENTOR(S) : Fang et al.

Page 1 of 2

It is certified that error appears in the above-identified patent and that said Letters Patent is hereby corrected as shown below:

In the Specification

Column 2, Line 41 should read as follows:
the at least one first via hole facing away from the light incident surface.

Column 4, Line 23 should read as follows:
FIG. 3B is a schematic diagram of another lens structure...

Figure 10B:
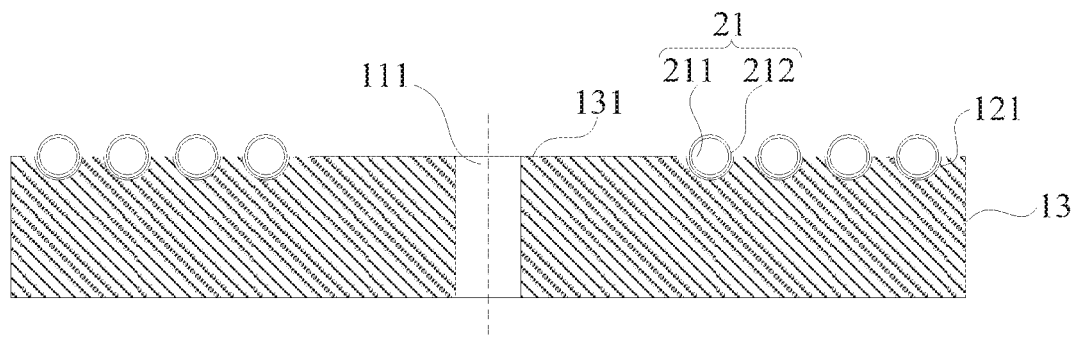
Figure 10C:
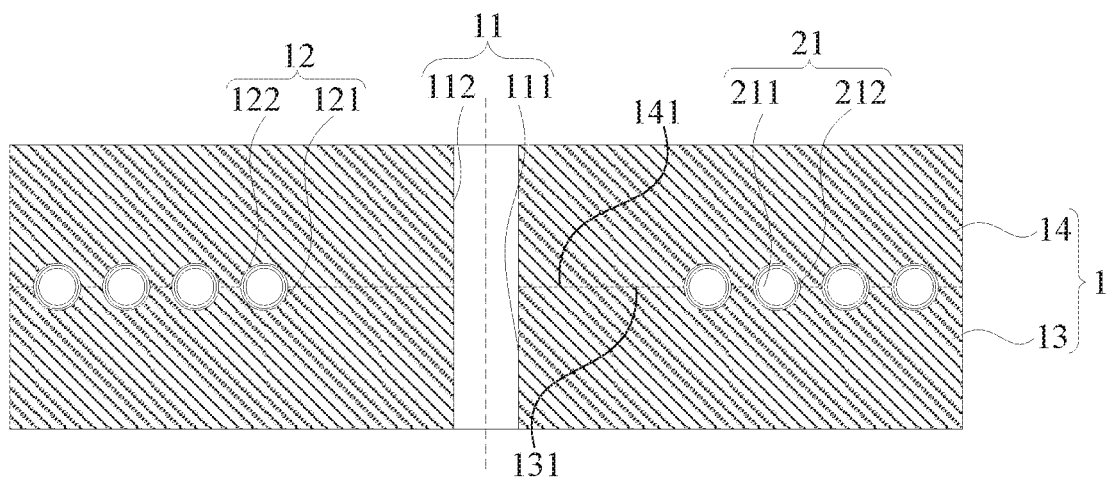

Column 4, Line 47 should read as follows:
FIGS. 10A to 10C are schematic diagrams showing steps...

Column 6, Line 25 should read as follows:
incident surface. For example, as shown in FIG. 2C, a light...

Column 6, Line 27 should read as follows:
shown in FIGS. 2A, 2B, 2D and 2E , the light guide plate...

Column 7, Line 38 should read as follows:
of the optical fiber is proximate to a light incident surface S of...

Column 8, Line 60 should read as follows:
second end 21b of the optical fiber, and directly contact...

Column 9, Line 19 should read as follows:
structure. The at least one lens structure 4 is disposed on...

Column 9, Line 57 should read as follows:
at least one lens structure is capable of converging the...

Column 14, Lines 22 and 37 the characters "\N" should be replaced with --W--

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,086,067 B2

Column 14, Line 60 should read as follows:
10C, the manufacturing method includes S100 to S300.

In the Claims

Claim 3, Column 17, Line 5 should read as follows:
a first end configured to receive the portion of light from the...

Claim 11, Column 17, Line 49 should read as follows:
at least one light source disposed at the at least one light...

Claim 19, Column 19, Line 1 should read as follows:
forming at least one first via hole by communicating the at...